(12) United States Patent
Frank et al.

(10) Patent No.: US 7,118,164 B2
(45) Date of Patent: Oct. 10, 2006

(54) APPARATUS FOR THE AIRFLOW-OPTIMIZED ORIENTATION OF AN AIRFLOW DEFLECTOR

(75) Inventors: Thorsten Frank, Aidlingen (DE); Stephan Kramb, Aichwald (DE); Karl-Heinz Schuller, Aidlingen (DE); Uwe Vahl, Heimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 59 days.

(21) Appl. No.: 11/051,479

(22) Filed: Feb. 7, 2005

(65) Prior Publication Data

US 2005/0173945 A1    Aug. 11, 2005

(30) Foreign Application Priority Data

Feb. 5, 2004    (DE)    ........... 10 2004 005 596

(51) Int. Cl.
*B60J 1/00*    (2006.01)
(52) U.S. Cl. .............. 296/180.5; 296/180.2; 296/180.3
(58) Field of Classification Search .......... 296/180.5, 296/180.2, 180.3
See application file for complete search history.

(56) References Cited

U.S. PATENT DOCUMENTS

| | | | | |
|---|---|---|---|---|
| 4,006,931 A | * | 2/1977 | Groves ................. | 296/180.3 |
| 4,102,548 A | | 7/1978 | Kangas | |
| 4,199,185 A | * | 4/1980 | Woolcock ............. | 296/180.2 |
| 4,245,862 A | * | 1/1981 | Buckley, Jr. ........... | 296/180.3 |
| 4,360,232 A | * | 11/1982 | Elder ................. | 296/180.4 |
| 4,375,898 A | * | 3/1983 | Stephens .............. | 296/180.3 |
| 4,379,583 A | * | 4/1983 | Taylor et al. .......... | 296/180.3 |
| 4,607,874 A | * | 8/1986 | Peairs ................ | 296/180.3 |
| 4,611,796 A | * | 9/1986 | Orr .................. | 296/180.2 |
| 4,779,915 A | * | 10/1988 | Straight .............. | 296/180.3 |
| 4,824,165 A | * | 4/1989 | Fry .................. | 296/180.5 |
| 4,919,472 A | * | 4/1990 | Wiley, Jr. ............ | 296/180.3 |
| 5,190,342 A | * | 3/1993 | Marlowe et al. ........ | 296/180.2 |
| 5,536,062 A | * | 7/1996 | Spears ............... | 296/180.5 |
| 6,428,084 B1 | * | 8/2002 | Liss ................. | 296/180.2 |
| 6,886,882 B1 | * | 5/2005 | Farlow et al. ......... | 296/180.5 |
| 2004/0239146 A1 | * | 12/2004 | Ortega et al. ......... | 296/180.2 |

FOREIGN PATENT DOCUMENTS

| | | |
|---|---|---|
| CA | 2 431 380 A1 | 12/2003 |
| DE | 26 16 948 | 10/1977 |
| DE | 38 23 161 A1 | 1/1990 |
| DE | 38 28 752 A1 | 3/1990 |
| EP | 1 031 497 A2 | 8/2000 |
| GB | 2 128 950 A | 5/1984 |

(Continued)

*Primary Examiner*—Kiran B. Patel
(74) *Attorney, Agent, or Firm*—Fitch, Even, Tabin & Flannery; Norman N. Kunitz

(57) ABSTRACT

An airflow deflector (5) guides the airflow (6) between a towing machine (1) and a transported unit (4, 32) adjoining the towing machine (1) in the travel direction (F) and is coupled with a setting system (7) for adjusting the orientation of the airflow deflector as needed. To ensure an optimal position of the airflow deflector at all times without human interference even when transported units of different external geometrical configurations are utilized, geometrical data (11) on the external geometry and/or positional data (12) are assigned to the transported unit (4, 32). This data, at least in case of a replacement of the transporting unit (4, 32) may be called up or read and forwarded to a control unit (21) that converts the geometrical and/or positional data into setting commands for the setting system (7) to adjust the airflow deflector (5).

8 Claims, 1 Drawing Sheet

FOREIGN PATENT DOCUMENTS

JP 04303602 5/1994

WO WO-2004/108506 A1 12/2004

* cited by examiner

APPARATUS FOR THE AIRFLOW-OPTIMIZED ORIENTATION OF AN AIRFLOW DEFLECTOR

CROSS REFERENCE TO RELATED APPLICATION

This application claims the priority of German Patent Application No. 10 2004 005 596.3 filed on Feb. 5, 2004, the subject matter of which, in its entirety, is incorporated herein by reference.

FIELD OF THE INVENTION

This invention relates to an apparatus for the airflow-optimized orientation of an airflow deflector that guides the airflow between a vehicle and a unit adjoining the vehicle in the direction of travel. The apparatus includes a setting system for changing the position of the airflow deflector as needed.

BACKGROUND OF THE INVENTION

The invention finds application particularly in the field of the truck and transport technology, where the vehicle is a truck and the unit is a transported unit. Within the framework of the invention, under transported unit there is meant a unit that is connected with a self-propelled towing device (tractor or towing machine) of a truck and/or is transportable by such a towing device. The unit may be a construction which travels on its own wheels, such as a semitrailer or trailer coupled in a known manner with the towing device. The transported unit, however, may also be a container or transporting crate which has a given external geometrical configuration and which is situated in a certain position on a loading platform of the towing device.

German Offenlegungsschrift (Laid-Open Application) DE 26 16 948 A1 describes a two-part vehicle spoiler whose adjustable part close to the road is pivoted away from the road at low speeds and which, forced by the travel-generated air stream, pivots back as a function of increasing vehicle speed.

German Offenlegungsschrift (Laid-Open Application) DE 38 28 752 A1 describes a further development of a device for adjusting a vehicle spoiler. The device, based on a continuous evaluation of detected operational parameters of the vehicle (such as speed, acceleration and travel in curves), adjusts the spoiler such that an optimal road-handling ability of the vehicle is ensured.

German Offenlegungsschrift (Laid-Open Application) DE 38 23 161 A1 discloses a wind deflecting device situated between the driver's cab and the adjoining semitrailer. For obtaining, in a simple manner, a uniform appearance with identical flow conditions between the cabs and/or the semitrailers of substantially different geometrical configurations, a kit, which comprises aerodynamic and complementally shaped unitary wind deflecting flaps or plates adjustable from the cab as well as different intermediate elements, is provided at the assembly plant. During vehicle assembly at the plant, a selection is made from the kit in accordance with the geometrical variants at hand.

An apparatus generic to the invention is disclosed in European Patent Application EP 1 031 497 A2 which relates to a mechanism for adjusting an airflow deflector mounted on the roof of a vehicle cab, for example, on the roof of a towing machine or tractor of a truck. In order to be able to adapt the position of the airflow deflector to trailers with different geometrical design in a possibly economical manner, the described apparatus includes an electrical setting device which comprises a spindle, a spindle nut and a rod connecting the spindle nut with the airflow deflector. The rotation of the spindle may be controlled from the cab of the towing machine to enable the driver to manually vary the position of the airflow deflector. The actual position of the airflow deflector may be displayed in the cab.

The operation of the above-outlined, relatively flexible and convenient apparatus which is adaptable to trailers and semitrailers of different geometrical configurations, largely depends on the experience and skill of the driver or relevant personnel for setting the airflow deflector in its flow-optimized position. Should the operator miss an (optimal) adjustment of the position of the airflow deflector, such a circumstance affects directly the aerodynamics of the entire system (for example, the $C_w$ value) and thus has, among others, an adverse effect on the fuel consumption and travel noise behavior of the vehicle. To avoid such misses, an intensified instructional and supervisory outlay is required which, however, particularly for the costs involved, is to be avoided to the extent possible.

It is thus an object of the invention to further develop an apparatus of the earlier-described type such that, even when using different transporting units having different external geometrical configurations, an optimal position of the airflow deflector is ensured at all times.

SUMMARY OF THE INVENTION

The above object is generally achieved according to the present invention by an apparatus for the airflow-optimized orientation of an airflow deflector guiding the airflow between a vehicle and a unit that adjoins the vehicle in the travel direction, including a setting system for adjusting the airflow deflector as needed, and wherein: data on the external geometrical configuration and/or data on the position of the unit are assigned to the unit; the geometrical and/or positional data are called up or read at least upon a replacement of the unit and forwarded to a control unit; and the control unit converts the geometrical and/or positional data into setting commands for the setting system.

Thus, an apparatus for the flow-optimized orientation of an airflow deflector is provided which guides the airflow between a vehicle and a unit adjoining the vehicle in the direction of travel. The apparatus encompasses a setting system for a required adjustment of the airflow deflector. Geometrical data on the outer geometrical configuration of the unit and/or positional data for the unit are associated with the unit. These data may be called or read, at least when the unit is replaced, and are applied to a control unit which converts the geometrical and/or positional data into setting commands for the setting system to adjust the position.

The basic principle underlying the invention resides, among others, in that the optimal setting, that is, the orientation of the airflow deflector system, is taken out of the range of human responsibility by providing an automatic adaptation to the aerodynamic conditions which change as a result of replacing the (transporting) unit. For this purpose the setting system receives setting commands, generated by the control unit, directly from the geometrical data on the external geometrical configuration of the actual (transporting) unit and/or its position, for example, on a loading platform of the towing machine.

It is thus a substantial advantage of the invention that an optimal setting of the airflow deflector system is reliably ensured independently from human operating errors or omissions. The driver or other personnel are relieved of this task, which is of great significance as concerns the economic profitability and environmental behavior of the vehicle.

Advantageous embodiments and further features of the invention are described in conjunction with the drawings. The invention finds particular application in the field of the truck and transporting technology.

According to a typical embodiment of the invention, the vehicle is a towing machine of a truck, e.g., a tractor, and the unit adjoining the towing machine in the direction of travel is a transporting unit of the towing machine, e.g., a trailer.

According to a variant of the above, the vehicle is a passenger car and the unit adjoining the car in the direction of travel is a spoiler, a sliding roof, a wind bulkhead or the like.

The information on the geometrical configuration (geometrical data) and/or the data concerning the position of the transporting unit may be transmitted to the control unit in a number of ways, for example, by cable or radio, actively or passively. The transporting unit may have a read-out memory in which the data characterizing the transporting unit are stored and which is, for example, a bar code or an electronically continuously transmitting transmitter.

A particularly advantageous embodiment in this respect provides that the memory is a transponder. Transponders are proven, reliable storage media in the automotive vehicle technology. They do not have their own energy supply but, upon query, utilize the energy of the received electromagnetic interrogation signal to transmit a response signal, for example, coded with the desired data.

The data may also be transmitted by cable, for example, by a cable connection which is necessarily present in a trailer or semitrailer as an electrical coupling.

It is also feasible to provide the transporting unit only with a single, unequivocal, identifying characteristic, to store the relevant geometrical data in a memory in the vehicle and to effect readout as required.

According to an embodiment of the invention particularly preferred in connection with a towing machine having its own loading platform, for example, a flat-bed truck, the towing machine has sensors that determining the geometrical data of the transporting unit, and/or sensors for determining the position of the transported unit, e.g., a container.

The invention will be discussed in more detail with reference to embodiments shown schematically in the drawing.

DETAILED DESCRIPTION OF THE INVENTION

Figure 1:
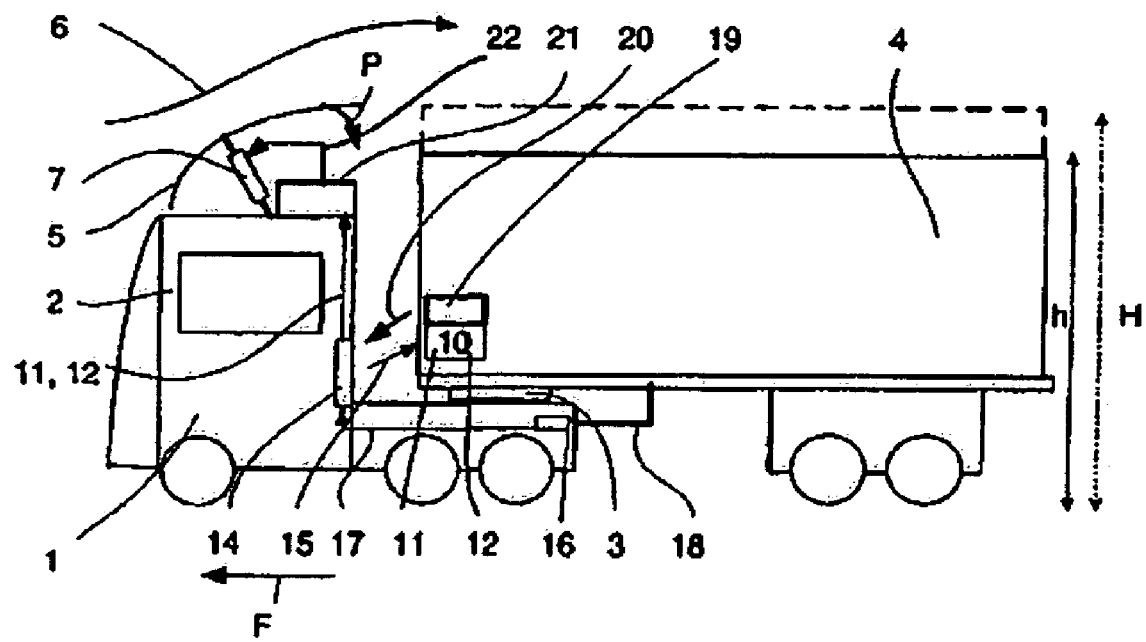
FIG. 1 is a schematic illustration of a towing machine, with a semitrailer and the apparatus according to the invention.

In the Figures, the same or functionally the same elements and signals—except if otherwise indicated—are provided with the same reference characters.

FIG. 1 illustrates a first embodiment of a motor vehicle provided with an apparatus according to the invention.

FIG. 1 shows a towing machine or tractor 1 having a cab 2 and a conventional coupling device 3 for a semitrailer or trailer adjoining the towing machine 1 in the travel direction F. The semitrailer is hereafter generally also referred to as a transported unit and represents an example of a unit 4 adjoining the towing machine 1 in the direction of travel. The towing machine, and the unit 4, i.e., a trailer or a semitrailer carrying a container, are components of a truck. On the roof of the cab 2, an airflow deflector 5 is arranged which guides the air stream 6, generated during vehicle travel, between the towing machine 1 and the transported unit 4. A setting system 7 is provided on the cab 2 for adjusting, e.g. pivoting, the airflow deflector 5 as needed for its flow-optimized orientation to thus transfer the airflow from the cab 2 to the trailer or container of the semitrailer in a possibly turbulence-free manner. The setting system 7 may be, for example, a hydraulically, pneumatically, electrically or similarly driven hoisting and lowering setting system.

The transported unit, i.e., the trailer or a semitrailer with container, is provided with a storage device 10 which contains geometrical data 11 and positional data 12. The data are preferably stored in a table (look-up table) of a storage device 10 mounted on the unit 4. The storage device 10 is preferably a permanent memory, such as a RAM, SRAM, SDRAM, or the like.

The stored data 11 and 12 represent, in case of a regular connection by means of the coupling 3, the external geometrical configuration of the trailer or semitrailer with container, particularly its profile and external dimensions, for example, its height h and its position relative to the cab 2.

The data 11 and 12 may be called up or read by an interrogating device 14 that, for example, is mounted on the rear side of the cab 2. The interrogating device 14 is, for example, a transmitter which, upon triggering, emits an interrogating signal 15. The triggering may be effected, for example, by another sensor 16 which recognizes the presence of a trailer or semitrailer. Thus, the sensor 16 recognizes if, subsequent to the removal of an earlier-used trailer or semitrailer, a new trailer or semitrailer is attached and at that time generates a triggering signal 17. In the alternative, the triggering signal 17 may be generated if, for example, a required electrical connection 18, for example, for illuminating the trailer or semitrailer, is established or every time the engine of the towing machine 1 is started.

The interrogating signal 15 emitted by the interrogating device 14 is applied to a transponder 19 which utilizes the received transmission power for generating and emitting a response signal 20 which contains the data of the memory 10. The interrogating device 14 forwards the data 11, 12 to a control unit 21 that is mounted on the vehicle and that converts the geometrical and/or positional data 11, 12 into setting commands 22 for the setting system 7, which in turn optimally positions the airflow deflector 5.

The control unit 21 is typically a component of a program-controlled device, such as a microprocessor or a microcontroller. It is, of course, to be understood that the function of the control unit 21 may be performed by a logic circuit, such as an FPGA circuit or a PLD circuit. The control unit 21 may be a component of an own control apparatus of the setting system 7. In the alternative, it is also feasible to perform the function of the control unit 21 by another control apparatus, for example, by the engine control apparatus. Moreover, the transmission of the various signals may be of any desired arrangement, e.g., conducted via radio waves, etc.

In the example shown in FIG. 1 let it be assumed that a previously towed trailer or semitrailer with container, shown in broken lines, had a greater height H than a newly-coupled trailer or semitrailer. After the replacement by the presently coupled trailer or semitrailer, the actual height h is less. The control unit 21 converts the geometrical and/or positional data 11, 12 into setting commands 22 which adjust the airflow deflector 5 to the lesser height h, that is, they lower the airflow deflector in the direction of the arrow P, so that it is positioned at an optimal position for the height of the newly coupled trailer or semitrailer.

Figure 2:
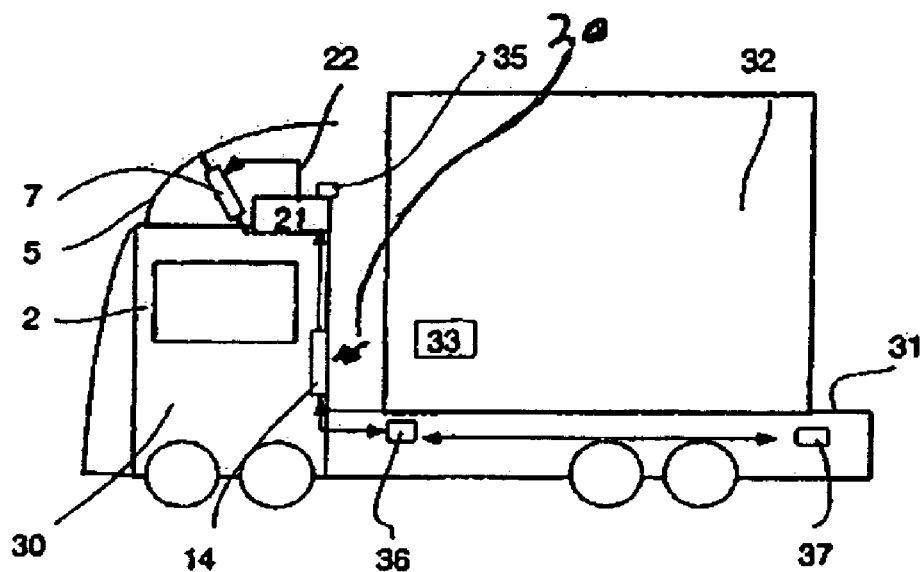
FIG. 2 is a schematic illustration of a towing machine having a loading platform and an apparatus according to the invention.

FIG. 2 shows a second embodiment of a motor vehicle provided with an apparatus according to the invention. According to FIG. 2, a variant is illustrated in which the towing machine 30 has its own loading platform 31 on which a transported unit, formed as a container 32, is deposited and secured. The container 32 is provided with a transponder 33 constituting a memory in which data relating to the geometrical configuration of the container 32, and possibly the position of the container on the platform 31, are stored in a prescribed manner. The data, similarly to the example of FIG. 1, may be read out by the interrogating device 14 and transferred to the control unit 21.

Further shown are a sensor 35 on the cab 2 for detecting the height of the container 32 and sensors 36, 37 on the loading platform 31 for detecting the position of the transporting unit 32 additionally or for verifying the data received by the interrogating device 14. The latter applies the response signal 20 of the transponder 33 and, if available, the signals of the sensors 35–37 to the control unit 21 which converts the geometrical and positional data into setting commands 22 for the setting system 7.

In the example of FIG. 2, the present actual height of the container 32 is higher than an earlier-transported transporting unit or container 32. The control unit 21 converts the read out geometrical and/or positional data into setting commands 22 such that a manner that the airflow deflector 5 is accordingly raised.

While the invention was described by way of preferred embodiments, it is not limited thereto, but may be modified in various ways.

Thus, the invention is not necessarily limited to towing vehicles, but it may evidently be applicable to any vehicles, particularly to motor vehicles. The invention may be advantageously utilized in passenger cars where the airflow deflector system according to the invention may be utilized, for example, for the automatic orientation of an airflow deflector in connection with a wind bulkhead, a spoiler and the like.

It will be appreciated that the above description of the present invention is susceptible to various modifications, changes and adaptations, and the same are intended to be comprehended within the meaning and range of equivalents of the appended claims.

What is claimed is:

1. An apparatus for the airflow-optimized orientation of an airflow deflector moveably mounted on a vehicle and guiding the airflow between the vehicle and a unit that adjoins the vehicle in the travel direction (F), comprising; a setting system mounted on the vehicle for adjusting the orientation of the airflow deflector as needed; a device mounted on the unit and containing data corresponding to at least the external geometrical configuration; and a reading circuit that reads out at least the geometrical data from the device at least upon a replacement of the unit; and a control unit that is connected in the reading circuit and converts the readout data into setting commands for the setting system, which is connected to an output of the control unit, to position the deflector.

2. The apparatus as defined in claim 1, wherein the device additionally containing and provides the control unit with data on the position of the unit relative to the deflector.

3. The apparatus as defined in claim 1, wherein the vehicle is a tractor of a truck, and the unit adjoining the vehicle in the travel direction (F) is one of a trailer and semitrailer carrying a container.

4. The apparatus as defined in claim 1, wherein the vehicle is a truck having its own load carrying platform; and the unit is a container mounted on the platform.

5. The apparatus as defined in claim 1, wherein the vehicle is a passenger motor vehicle, and the unit adjoining the passenger motor vehicle in the travel direction is one of a spoiler, a sliding roof and a wind bulkhead, mounted on the passenger motor vehicle.

6. The apparatus as defined in claim 1, wherein the device mounted on the unit and containing the at least geometrical data is an electronic memory.

7. The apparatus as defined in claim 6, wherein the electronic memory device is a transponder.

8. The apparatus as defined in claim 1, wherein the vehicle is provided with sensors for determining at least one of the geometrical data of the unit and the position of the unit, and for supplying the data to the control unit for use in controlling the position of the deflector.

* * * * *